(12) United States Patent
Svensson (10) Patent No.: US 11,964,823 B2
(45) Date of Patent: Apr. 23, 2024

(54) THERMAL PROCESSING APPARATUS

(71) Applicant: John Bean Technologies AB, Helsingborg (SE)

(72) Inventor: Leif Teddy Svensson, Marieholm (SE)

(73) Assignee: JOHN BEAN TECHNOLOGIES AB, Helsingborg (SE)

( * ) Notice: Subject to any disclaimer, the term of this patent is extended or adjusted under 35 U.S.C. 154(b) by 0 days.

(21) Appl. No.: 17/660,578

(22) Filed: Apr. 25, 2022

(65) Prior Publication Data
US 2022/0340366 A1 Oct. 27, 2022

Related U.S. Application Data

(60) Provisional application No. 63/180,219, filed on Apr. 27, 2021.

(51) Int. Cl.
  *B65G 23/04* (2006.01)
  *B65G 15/02* (2006.01)
  *B65G 21/18* (2006.01)

(52) U.S. Cl.
  CPC .............. *B65G 23/04* (2013.01); *B65G 15/02* (2013.01); *B65G 21/18* (2013.01); *B65G 2207/24* (2013.01)

(58) Field of Classification Search
  CPC ........ B65G 23/04; B65G 15/02; B65G 21/18; B65G 2207/24; A21B 1/48
  See application file for complete search history.

(56) References Cited

U.S. PATENT DOCUMENTS

| | | | | |
|---|---|---|---|---|
| 3,733,848 | A | * 5/1973 | Duron | F25D 25/04 62/381 |
| 4,875,343 | A | * 10/1989 | Jeppsson | B65G 21/18 62/381 |
| 4,944,162 | A | * 7/1990 | Lang | F25D 25/04 198/852 |
| 9,044,022 | B2 | 6/2015 | van der Eerden et al. | |
| 9,700,059 | B2 | 7/2017 | van der Eerden et al. | |

(Continued)

FOREIGN PATENT DOCUMENTS

JP 5167549 B2 3/2013

OTHER PUBLICATIONS

Search Report dated Nov. 30, 2022, issued in corresponding NL Application No. 2031685, filed Apr. 22, 2022, 12 pages.

*Primary Examiner* — Gene O Crawford
*Assistant Examiner* — Abby A Jorgensen
(74) *Attorney, Agent, or Firm* — Christensen O'Connor Johnson Kindness PLLC (57) ABSTRACT

A conveyor belt is arranged in tiers at spiral stack conveyor unit. A ceiling is positioned over the spiral stack(s). A circulation fan draws thermal processing medium laterally from the tiers of the spiral stack, up the exterior of the stack and across the ceiling and through a heat exchanger. The treated thermal processing medium is then routed across the remainder of the diameter of the spiral stack and then down the side of the spiral stack diametrically opposite to the circulating fan to enter the spiral stack in a lateral direction diametrically toward the circulating fan. The thermal processing medium flows into an opening formed in the ceiling downstream of the heat exchanger and into the interior of the conveyor drive hub and then into the spiral stack through openings in the drive hub outer wall.

22 Claims, 9 Drawing Sheets

(56) References Cited

U.S. PATENT DOCUMENTS

| | | | |
|---|---|---|---|
| 10,039,304 B2 * | 8/2018 | Ohrlander | A23L 3/001 |
| 2002/0031582 A1 | 3/2002 | Perrine | |
| 2005/0092014 A1 * | 5/2005 | Nothum | A23L 3/361 |
| | | | 62/380 |
| 2007/0298148 A1 * | 12/2007 | van der Eerden | A21B 1/40 |
| | | | 99/516 |
| 2015/0245643 A1 * | 9/2015 | Kop | A23B 4/0526 |
| | | | 99/331 |
| 2017/0318819 A1 * | 11/2017 | van de Rijt | A21B 1/48 |
| 2018/0213801 A1 * | 8/2018 | Morey | A23L 3/06 |
| 2019/0373924 A1 * | 12/2019 | Gasteyer, III | A23L 3/361 |
| 2020/0120957 A1 * | 4/2020 | Svensson | A21B 1/48 |
| 2021/0122577 A1 * | 4/2021 | Norén | B65G 21/10 |

\* cited by examiner

THERMAL PROCESSING APPARATUS

CROSS-REFERENCE TO RELATED APPLICATION

This application claims the benefit of U.S. Provisional Application No. 63/180,219, filed Apr. 27, 2021, the entire contents of which are incorporated herein by reference.

BACKGROUND

Spiral conveyor-based thermal processing systems include a heating surface or a cooling/freezing surface in the form of a pervious conveyor belt for conveying work pieces, including food, through a thermal processing chamber in a spiral or helical path. If the work piece is being cooked or otherwise heated, the heat source, such as steam, heated air, or mixtures thereof, is provided within or adjacent the cooking chamber for heating the work pieces. Correspondingly, if thermal processing is in the form of cooling or freezing, then the source of cooling medium is provided either within the cooling/freezing chamber or adjacent thereto.

In one type of spiral conveyor-belt system, a belt wraps around and is driven in helical pattern by a central hub. The inside edge of the belt contacts the hub to be driven by the hub along an upwardly extending spiral path if a single spiral belt is utilized. In such case, the belt carrying work products to be processed enters the bottom of the processing chamber within which the belt is located. At the top of the spiral path, the conveyor belt exits the processing chamber with work product being processed. Another type of spiral conveyor system employs two side-by-side spiral stacks, each driven by a central drive tower or hub. One drive tower or hub drives the conveyor belt in an upward spiral, and then the conveyor belt extends across to the second drive tower which drives the conveyor belt in a downward spiral, and then out the processing chamber.

An advantage of thermal processing systems utilizing spiral conveyor belts is that a relatively long processing path may be achieved with a small footprint. For example, a 600-foot-long thermal processing conveyor belt in a spiral configuration can be contained within about a 20-foot×20-foot×20-foot housing. However, spiral stack conveyor thermal processing systems do have some inherent drawbacks from a linear oven or freezer of a comparable length. In a linear oven or freezer, the upper and lower surfaces are exposed to being efficiently impinged upon by the thermal processing medium. However, in a spiral oven or freezer, the work products are not as directly accessible to the thermal processing medium since the work products are arranged in stacked layers, thus requiring a less direct thermal processing method than direct impingement of the thermal processing medium onto the work product.

In one spiral stack conveyor configuration, a fan system is used to direct the flow of thermal processing medium in the form of 100% steam or air or a mixture of steam and air horizontally across the layers of the spiral stack. A fan system is used to draw the processing medium across the stack and around the drive tower and then typically up to a location above the spiral stack and through a heat exchanger to either heat or cool the treating medium. Once exiting the heat exchanger, the treated medium is directed to flow downwardly along an exterior portion of the stack diametrically opposite to the location of the circulating fans to draw the heating medium laterally into the spiral stack and then across the spiral stack, including around the drive tower.

As will be appreciated, this flow arrangement of the thermal treating medium may not achieve uniform treatment of all of the work products positioned across the width of the helically arranged conveyor. This is especially true for the work products located at the inside of the conveyor adjacent the drive tower. In the situation of a spiral conveyor oven, a disproportion of the heat energy of the thermal processing fluid may be absorbed by the work product located along the outer perimeter of the spiral conveyor stack so that relatively less heat energy is available to process the work product located along the inside of the conveyor belt adjacent the drive drum.

The present disclosure provides thermal processing systems that seek to address the foregoing drawbacks of existing spiral conveyors.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a thermal processing apparatus is provided, which includes:

(a) a powered drive drum tower having a height and a covered exterior with openings formed in the covered exterior that constitute from about 5% to about 20% of the area of the covered exterior;

(b) a conveyor having a side edge engaged against the exterior of the drive drum tower in a spiral path around the drive drum tower to form a tiered spiral stack;

(c) a top sheeting disposed over the spiral stack;

(d) a circulation system to collect gaseous thermal processing medium from the tiers on the spiral stack and direct processing medium along an upward flow path located outward of the spiral stack to an elevation above the top sheeting, and then across the top sheeting, and then in a downward flow path along the exterior of the spiral stack at a location across from the upward flow path of the thermal processing medium, to enter the tiers of the spiral stack, (e) the top sheeting defining at least one entrance opening located above the drive drum tower to provide a flow route for a portion of the thermal processing medium flowing across the top sheeting to downwardly enter the drive drum tower and then flow out of the drive drum tower through the openings in the covered exterior of the drive drum tower and across the tiers of the spiral stack.

In any of the embodiments described herein, wherein the openings formed in the covered exterior of the drive drum constitute from about 10% to about 15% of the area of the covered exterior.

In any of the embodiments described herein, wherein openings formed in the covered exterior of the drive drum extend along the height of the drum tower.

In any of the embodiments described herein, wherein openings formed in the covered exterior of the drive drum comprise slots extending along the height of the drum tower.

In any of the embodiments described herein, wherein the percentage of thermal processing medium flowing through the at least one entrance opening in the top sheeting is in the range of 2% to 12% of the total flow of the gaseous thermal processing fluid.

In any of the embodiments described herein, wherein the percentage of thermal processing medium flowing through the at least one entrance opening in the top sheeting is in the range of 5% to 10% of the total flow of the gaseous thermal processing fluid.

In any of the embodiments described herein, further comprising one or more diverter structures extending upwardly from the top sheeting to divert thermal processing medium into the entrance opening.

In any of the embodiments described herein, wherein the diverter structures comprising a hood structure extending upwardly from the top sheeting to divert thermal processing medium into the entrance opening.

In any of the embodiments described herein, further comprising a heat exchanger for transferring thermal energy from or to the thermal processing medium.

In any of the embodiments described herein, wherein the heat exchanger is positioned above the top sheeting within the flow path of the thermal processing medium.

In any of the embodiments described herein, wherein the entrance opening is formed in the top sheeting downstream the location of the heat exchanger.

In accordance with one embodiment of the present disclosure, a thermal processing apparatus is provided, which includes:

(a) a housing;
(b) a conveyor belt arranged into two spiral interconnected stacks positioned side-by-side to each other within the housing, the conveyor belt of each stack having an inside edge engaged against the exterior of an upright drum tower for driving the conveyor belt in tiered angular travel paths for supporting work products during thermal processing;
(c) the drum towers having a covered exterior with openings formed in the covered exterior that constitute from about 5% to about 20% of the area of the covered exterior;
(d) an upright partition wall positioned between the two spiral stacks of the conveyor belt;
(e) a top sheeting disposed over the two spiral stacks of the conveyor belt;
(f) a circulation system positioned in the housing with respect to each spiral conveyor stack at locations spaced away from the partition wall to draw spent gaseous thermal processing medium from the tiers of the spiral stacks and direct the thermal processing medium along upward flow paths located outward of the spiral stacks to an elevation above the top sheeting, and then across the top sheeting toward the center partition wall, and then downwardly along a flow path exterior of the spiral stacks and adjacent the partition wall to laterally enter the tiers of the conveyor belt stacks;
(g) the top sheeting for each of the conveyor belt stacks defining at least one entrance opening disposed above a corresponding drive drum tower to provide an alternative flow route for a portion of the thermal processing medium downwardly into the drive drum towers and then flow out of the drive drum towers through the openings in the covered exterior of the drive drum towers and across the tiers of the conveyor belt stacks.

In any of the embodiments described herein, wherein openings formed in the covered exterior of the drive drums constitute from about 10% to about 15% of the area of the covered exterior.

In any of the embodiments described herein, wherein openings formed in the covered exterior of the drive drums extend along the height of the drum towers.

In any of the embodiments described herein, wherein openings formed in the covered exterior of the drive drums comprise slots extending along the heights of the drum towers.

In any of the embodiments described herein, wherein the percentage of thermal processing medium flowing through the at least one entrance opening in the top sheeting is in the range of 2% to 12% of the total flow of the gaseous thermal processing fluid.

In any of the embodiments described herein, wherein the percentage of thermal processing medium flowing through the at least one entrance opening in the top sheeting is in the range of 5% to 10% of the total flow of the gaseous thermal processing fluid.

In any of the embodiments described herein, further comprising one or more diverter structures extending upwardly from the top sheeting to divert thermal processing medium into the entrance openings.

In any of the embodiments described herein, wherein the diverter structures comprising hood structures extending upwardly from the top sheeting to divert thermal processing medium into the entrance openings.

In any of the embodiments described herein, further comprising heat exchangers for transferring thermal energy from or to the thermal processing medium.

In any of the embodiments described herein, wherein the heat exchangers are positioned above the top sheeting within the flow path of the thermal processing medium.

In any of the embodiments described herein, wherein the entrance openings are formed in the top sheeting downstream the locations of the heat exchangers.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well known process steps have not been described in detail in order not to unnecessarily obscure various aspects of the present disclosure. Further, it will be appreciated that embodiments of the present disclosure may employ any combination of features described herein.

The present application may include references to "directions," such as "forward," "rearward," "front," "back," "ahead," "behind," "upward," "downward," "above," "below," "horizontal," "vertical," "top," "bottom," "right hand," "left hand," "in," "out," "extended," "advanced," "retracted," "proximal," and "distal." These references and other similar references in the present application are only to assist in helping describe and understand the present disclosure and are not intended to limit the present invention to these directions.

The present application may include modifiers such as the words "generally," "approximately," "about," or "substantially." These terms are meant to serve as modifiers to indicate that the "dimension," "shape," "temperature," "time," or other physical parameter in question need not be exact, but may vary as long as the function that is required to be performed can be carried out. For example, in the phrase "generally circular in shape," the shape need not be exactly circular as long as the required function of the structure in question can be carried out.

The present application refers to "work product" or "workpiece" synonymously. One example of a work product or workpiece described in the present application is a food product, such as for example, beef, pork, fowl, poultry, fish, vegetables, fruits, and nuts.

In the following description and in the accompanying drawings, corresponding or similar systems, assemblies, apparatus and units may be identified by the same part number, but with an alpha suffix or with a prime or double prime designation. The descriptions of the parts/components of such systems assemblies, apparatus, and units that are the same or similar are not repeated so as to avoid redundancy in the present application.

Figure 1:
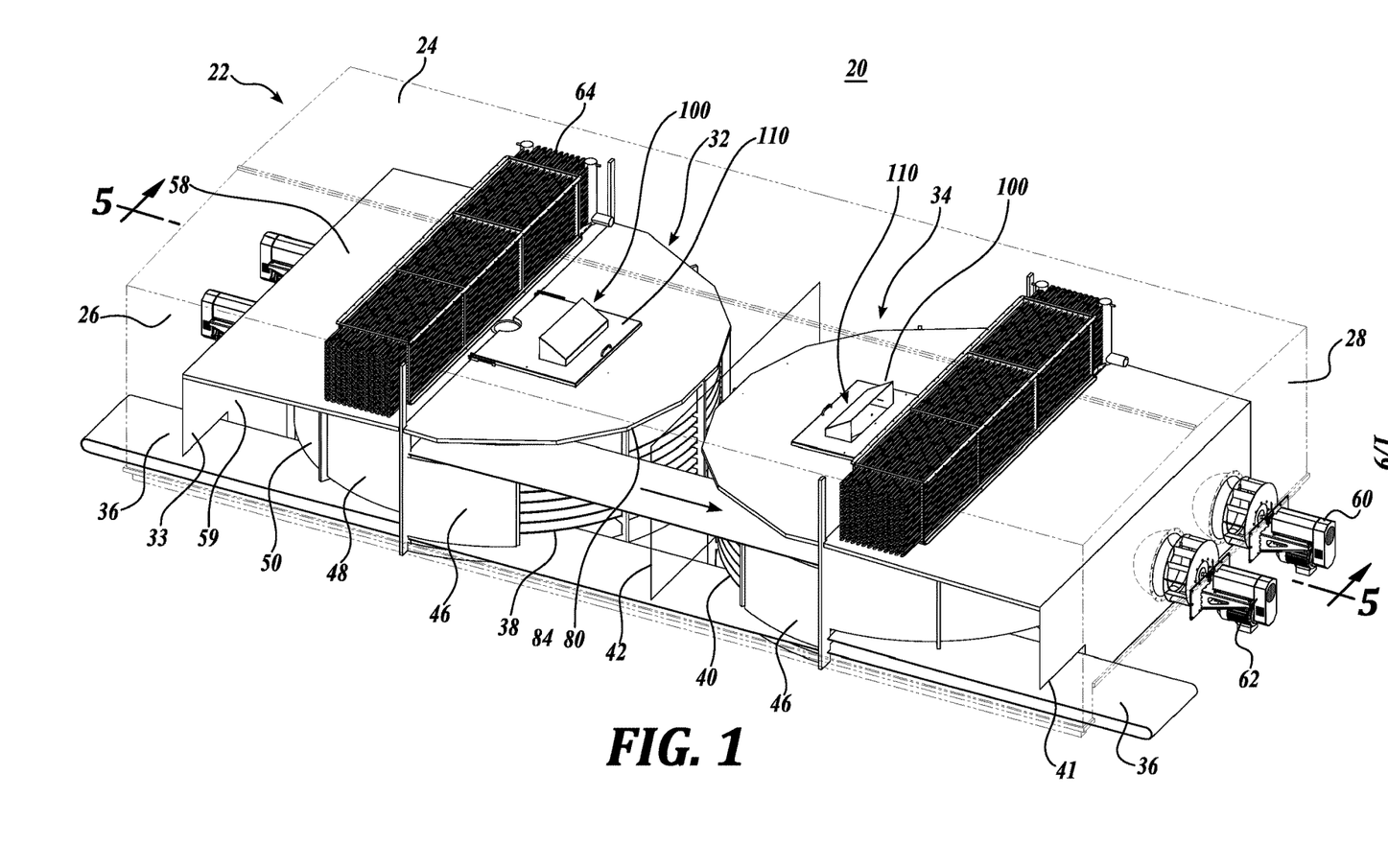
FIG. 1 is a pictorial view of an embodiment of the present disclosure showing dual spiral conveyor stacks.
Figure 2:
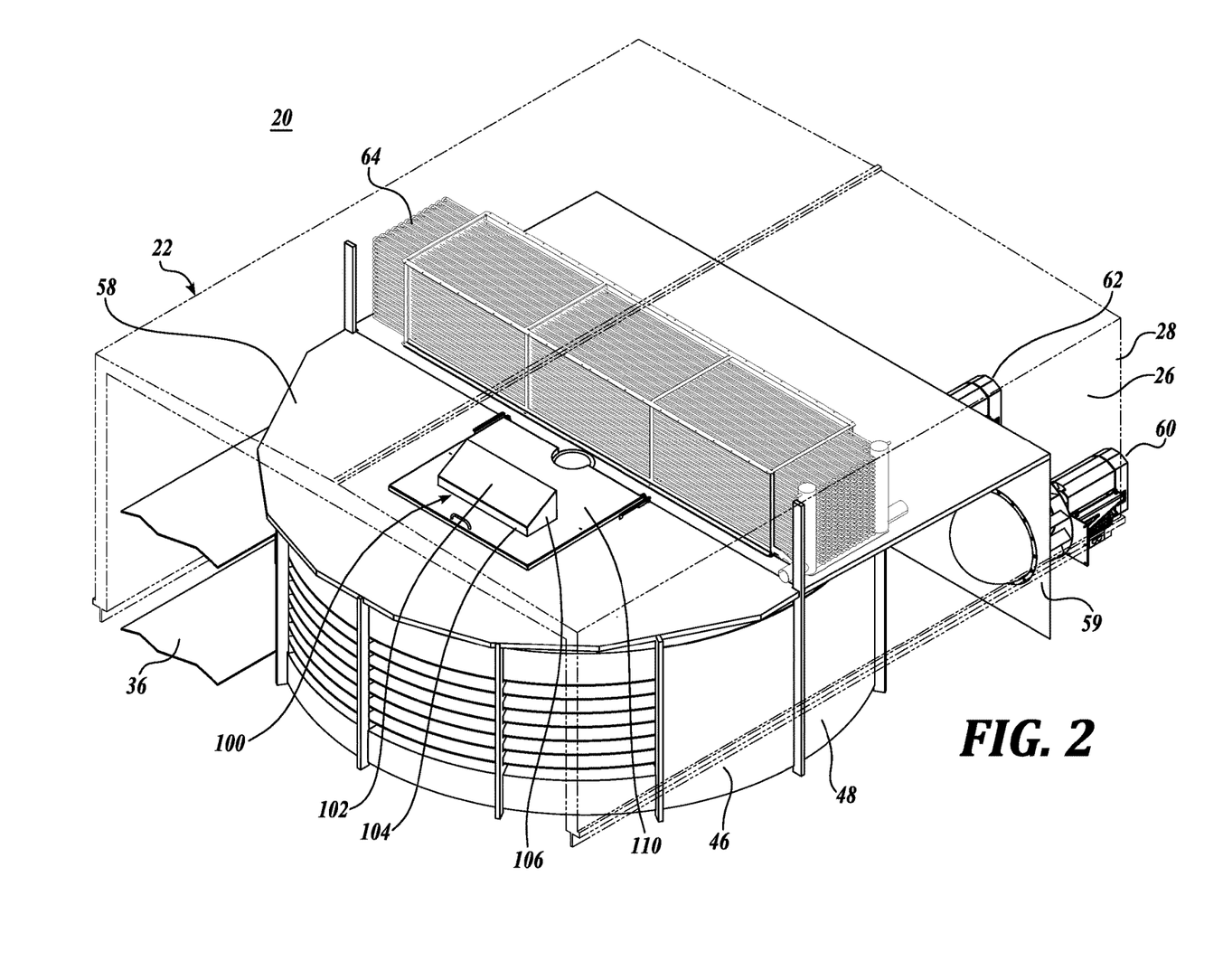
FIG. 2 is a pictorial view of a portion of FIG. 1 showing a single spiral conveyor stack.
Figure 3:
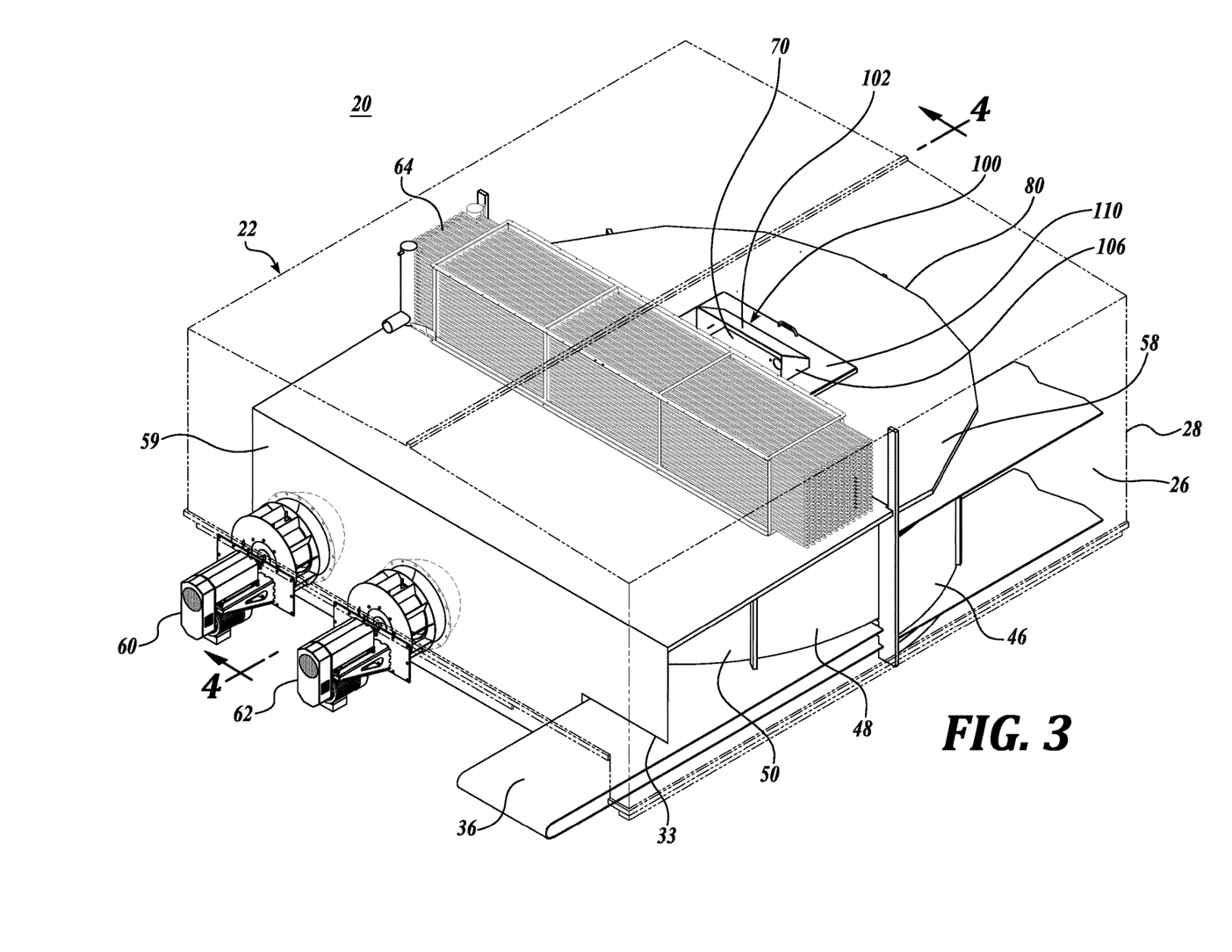
FIG. 3 is a view similar to FIG. 2, but taken from the opposite side of FIG. 2.

Referring initially to FIGS. 1-5, a first embodiment of a thermal processing apparatus 20 is illustrated as including a generally rectangularly shaped housing 22 having a top section 24, longitudinal side sections 26, and transverse end sections 28, as well as a floor 30. The housing 22 is sized to contain first and second spiral or helical conveyor units 32 and 34. A continuous powered conveyor belt 36 is arranged in tiers forming an ascending spiral stack 38 in conveyor unit 32 and arranged in tiers forming a descending spiral stack 40 in conveyor unit 34. As shown in FIG. 1, the conveyor belt 36 enters the spiral conveyor unit 32 at the bottom thereof at an inlet 33, and then travels in a spiral until reaching the top of the spiral stack 38, and then extends tangentially from stack 38 to the top stack 40 to descend along the spiral conveyor unit 34 to eventually exit the unit 34 at an outlet 41 from the bottom tier of the stack 40.

A center or mid wall 42 divides the two spiral conveyor units 32 and 34 into separate zones wherein different process media conditions can be employed. For example, the temperature of the air or other processing medium, the moisture in the air, etc., may be different in the two zones created by the mid or cross wall 42.

The circumferences of the conveyor stacks 38 and 40 are partially enclosed by side panels including panels 46, 48 and 50 which are visible in the figures, as well as additional panels facing the ends 28 of the housing 22 which are not visible in the figures. However, the sections of the conveyor stacks 38 and 40 facing the cross wall 42 are substantially open for receiving the processing medium therein, as discussed below.

Figure 4:
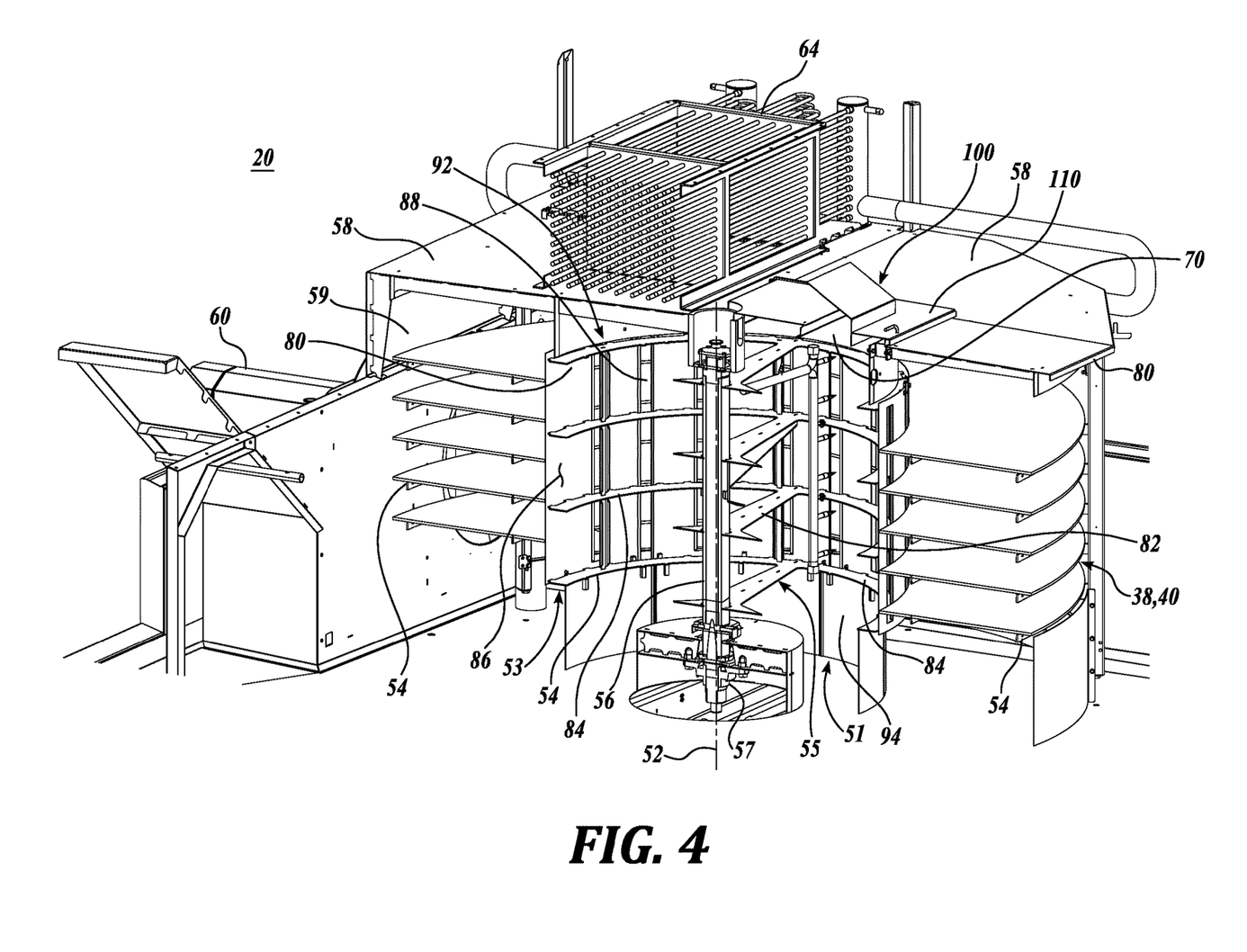
FIG. 4 is a pictorial cross-sectional view of FIG. 3 taken along lines 4-4 thereof.
Figure 5:
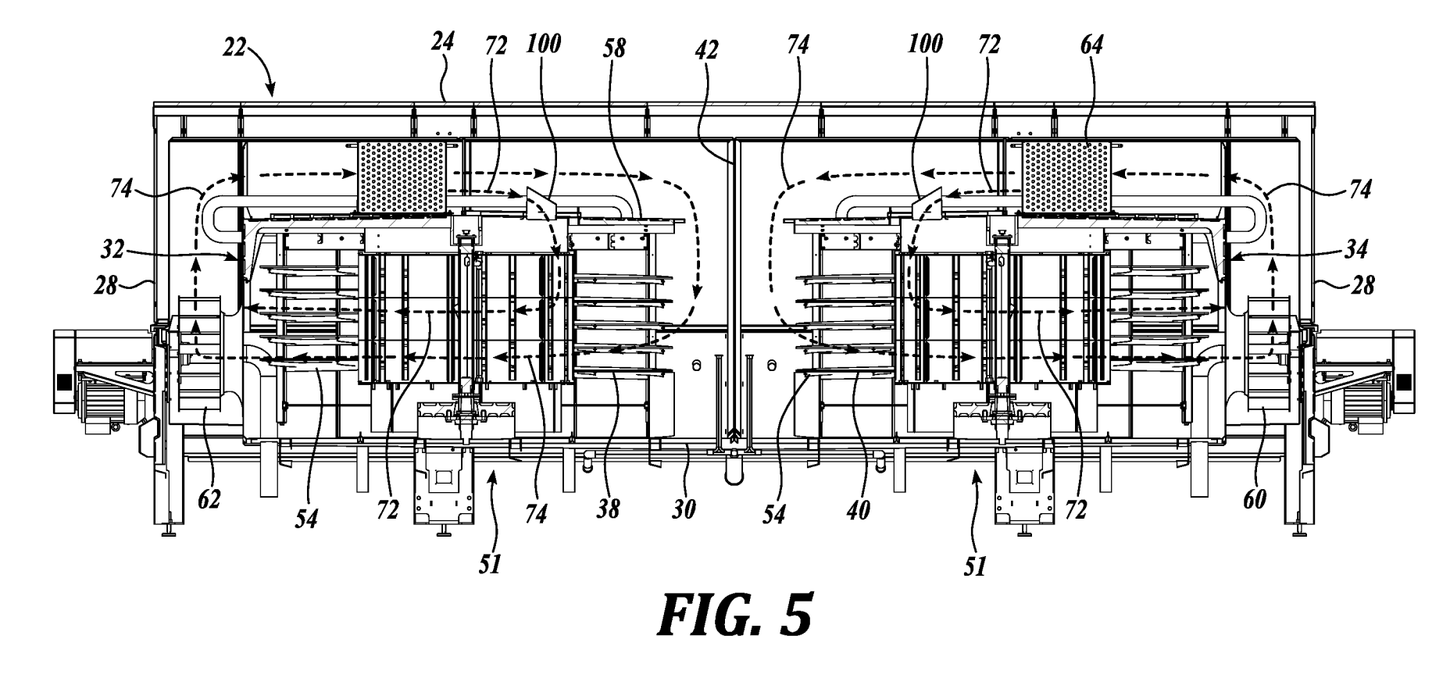
FIG. 5 is a schematic cross-section view of FIG. 1 taken along lines 5-5 thereof.

As best shown in FIG. 4, the center of the conveyor stacks 38 and 40 extend around a central drive system 51 that rotates the conveyor units 32 and 34 about a central axis 52. The drive system includes a cylindrical drive drum tower (or simply "drive drum") 53 that frictionally, rotationally drives conveyor belt 36 over supports 54 that are fixed in place, thereby to rotate the belt about axis 52. The belt 36 tightens around the drive drum 53 creating enough friction therebetween to drive the belt forward to slide over the supports 54. The drive drum 53 is carried by a frame structure 55 radiating outward from central vertical axle 56 that extend upwardly from a power unit 57 that rotates the drum drive axle 56 about axis 52.

Figure 6:
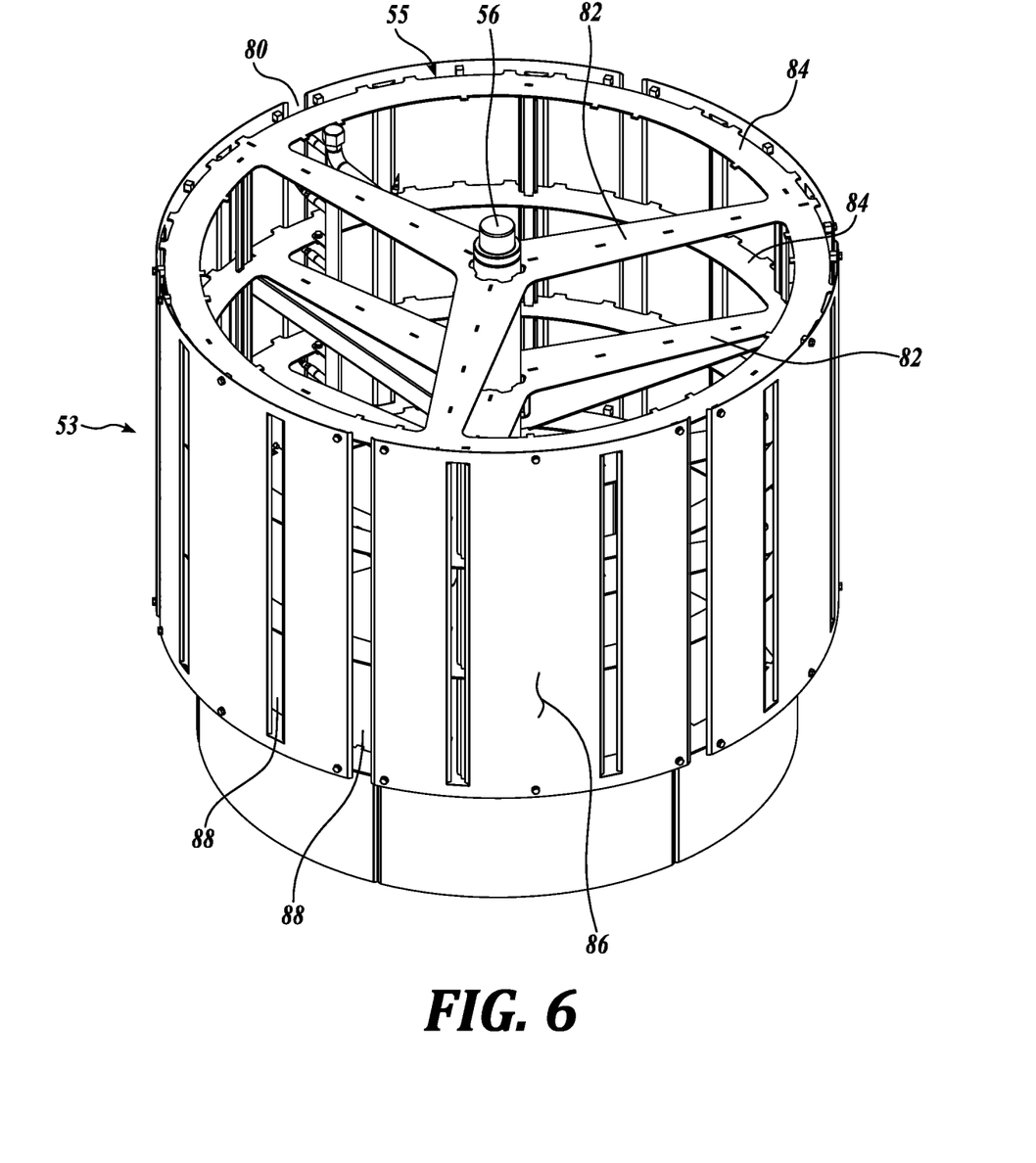
FIG. 6 is a pictorial view of a conveyor drive hub in accordance with the present disclosure.
Figure 7:
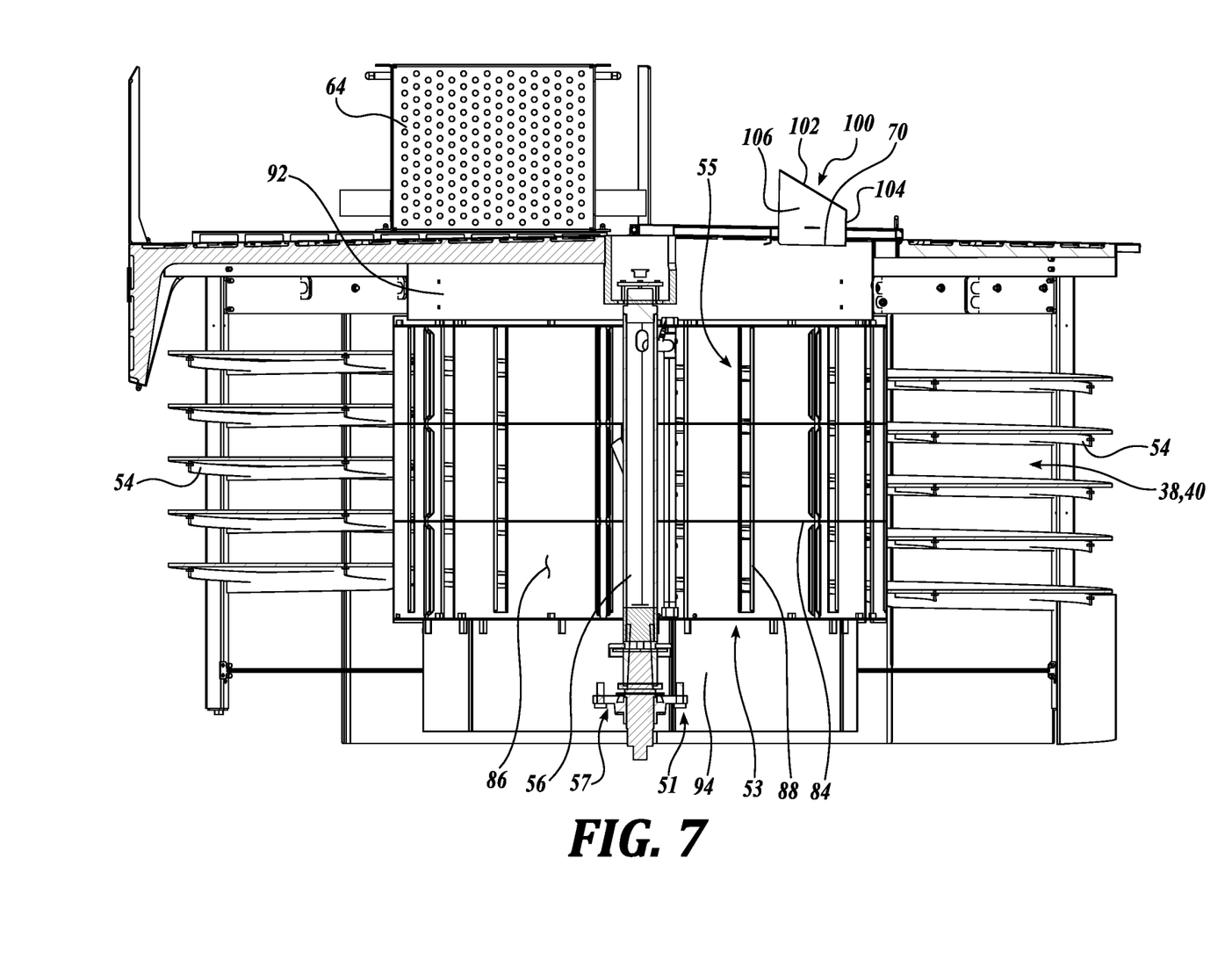
FIG. 7 is a cross-sectional view of the drive hub of FIG. 6 shown in driving engagement with a conveyor stack.

Additionally, referring to FIGS. 6 and 7, the frame structure 55 is composed of a plurality of circular band structures 80 mounted in vertically space apart relationship along the height of vertical axle 56. Each band structure 80 includes spokes 82 that radiate outwardly from the vertical axle 56 to an outer circular rim 84. The exterior of the drive drum 53 is substantially covered by a wall 86 that wrap around the circular rim. Vertical slots or openings 88 are formed in the wall 86 to allow processing fluid to pass outwardly from the interior of the drive drum over the tiers of the conveyor stacks 38 and 40, as described below. Although the openings 88 are shown as vertical slots, the openings can be of other configurations, for example, diagonal or spiral slots, or a series of individual circular other shaped openings or perforations in the wall 86.

The percentage of the surface area of the wall 86 defined by the slots or openings 88 can vary depending on various factors, including the volumetric flow rate of the processing medium flowing through the conveyor stacks 38 and 40, the width of the conveyor belt 36, the speed of travel of the conveyor belt 36, the thermal transfer rate occurring within the apparatus 20. Other factors include the type of work product, work product shape, the work product composition, and the loading level and loading pattern of the work product As one example of the present disclosure, the percentage of the surface area of wall 86 defined by the slots or openings 88 can be from 5% to 20%. In a further example, the percentage of the surface area of wall 86 defined by the slots or openings 88 can be from 10% to 15%. As a more specific example, the percentage of service area of wall 86 defined by slots or openings 88 can be approximately 13%.

Reduced diameter upper and lower drum sections 92 and 94 are located at the top and bottom of the drive drum 53 so as to be at elevations above and below, respectively, of the tiers of the conveyor stacks 38 and 40. The upper and lower drum sections 92 and 94 are of closed construction, meaning no openings extend therethrough in the manner of openings 88 in the drum wall 86. Thus, processing medium is prevented from flowing out of the drive drum 53 through the upper and lower drum sections 92 and 94. Rather, the processing medium flows out of the drive drum only at elevations corresponding to the elevations of the conveyor stack tiers.

A ceiling or top sheet structure 58 overlies a substantial portion of the conveyor stacks 38 and 40. The ceiling structure toward the mid wall 42 may be shaped to correspond to the circular shape of the conveyor stacks 38 and 40. However, from about the center of the conveyor stacks toward the housing end walls 28, the ceiling structure 58 may be generally rectangular in shape, and once past the circumference of the stacks 38 and 40, the ceiling structure extends downwardly to form a flange section 59.

Circulation fans 60 and 62 are positioned at outward sides of the conveyor units 32 and 34 to draw processing medium, for example, air, across the interior of the conveyor stacks 38 and 40 and around the drive drum 53 so as to thermally treat the work products being carried on the conveyor belt 36, as depicted by arrows 74. The fans 60 and 62 then direct such processing medium upwardly along the end walls 28 of the housing 22 toward the top section 24 of the housing. Although two fans 60 and 62 are shown, it is to be understood that a single fan can be used for each conveyor unit, or more than two fans could be used.

Thereafter, the processing medium is directed through a heat exchanger 64 extending transversely across the top of each of the stacks 38 and 40. Again, see arrows 74. The heat exchanger 64 may be mounted on or just above the ceiling 58 by an appropriate mounting structure.

The processing air or other medium being circulated by the fans 60 and 62 when passing through the heat exchanger 64 is either cooled or heated as desired. The heated or cooled processing medium then flows over the ceiling 58 until reaching the cross wall 42 wherein the processing medium is deflected downwardly to flow along the exposed adjacent portion of the conveyor stacks 38 and 40 and enter into the stacks in a lateral direction as depicted by arrows 74 in FIG. 5.

In a typical installation, the ceiling 58 would cover the entire top of the stacks 38 and 40 so that all the processing medium would be forced to flow over the top of the ceiling until reaching the cross wall 42 to then be directed downwardly and then laterally into the tiers of the stacks 38 and 40. However, for spiral conveyor systems that have relatively wide conveyor belts, it is difficult to achieve uniform processing of the work products that extend across the entire width of the conveyor belt 36. Applicant has discovered that providing an opening 70 in the portion of the ceiling 58 located downstream of the heat exchanger, but over the drive drum, enables a portion of the processing medium to flow downwardly through the opening and into the interior of the drive drum. From the interior of the drive drum, the conditioned processing medium flows out through the drive drum slots or openings 88 and across the tiers of the spiral conveyor stacks in the direction toward the circulation fans 60 and 62. As a result, more uniform thermal processing of the work product across the entire width of the conveyor belt 36 is achieved.

As shown in FIGS. 1-5 and 7, a hood structure 100 is positioned over ceiling opening 70 to divert a portion of the condition processing medium exiting the heat exchanger 64 downwardly through the opening 70 and into the interior of the drive hub 53, as schematically shown by arrows 72. From the interior of the drive hub 53, the diverted condition processing medium passes over the section of the conveyor stack tiers located adjacent the fans 60 and 62. Again see arrows 72. Normally, this section of the conveyor stack tiers only receives the processing medium that enters the conveyor stack tiers from the diametrically opposite side of the conveyor stack, adjacent the mid wall 42, depicted by arrows 74. By the time such processing medium travels across the conveyor stack, much of the processing heat originally contained in the processing medium has already been transferred to the work product located closer to the mid wall 42. Thus, by the foregoing "open" construction of the drive hub 53, more uniform heating of the work product being processed within the apparatus 20 occurs. This correspondingly results in more uniformly and evenly processed work product across the width of the conveyor stack.

The hood structures 100 are shown as including a sloped top wall 102 that intersects a short upright rear wall 104. Side walls 106 intersect the top 102 and rear 104 walls. With this construction, the hood structures capture the conditioned processing medium expelled by the heat exchanger 64.

The hood structures 100 are depicted as being mounted on an access hatch 110 located above drum drive units 53. In this manner, the hood structures are located laterally centrally relative to the diameter of the drum drive units 53. Nonetheless, it is to be understood that the hood structures can be located elsewhere on the ceiling 58. Further, the hood structures can be of configurations other than as described and illustrated above. For example, rather than a single hood structure 100 for each drive drum, two or more smaller hood structures can be employed.

The proportion of the processing that is diverted through the opening 70 can be very depending on the factors noted above with respect to the percentage of open area of the drive drum outer wall 86. As one example, the percentage of processing medium that is diverted through the opening 70 can be from about 5% to about 10% of the total processing medium circulating through the housing 22. In a more specific example, the percentage of processing medium that is diverted through the opening 70 can be about 7% to 8% of the total processing medium circulating through the housing 22.

EXAMPLE 1

Figure 8:
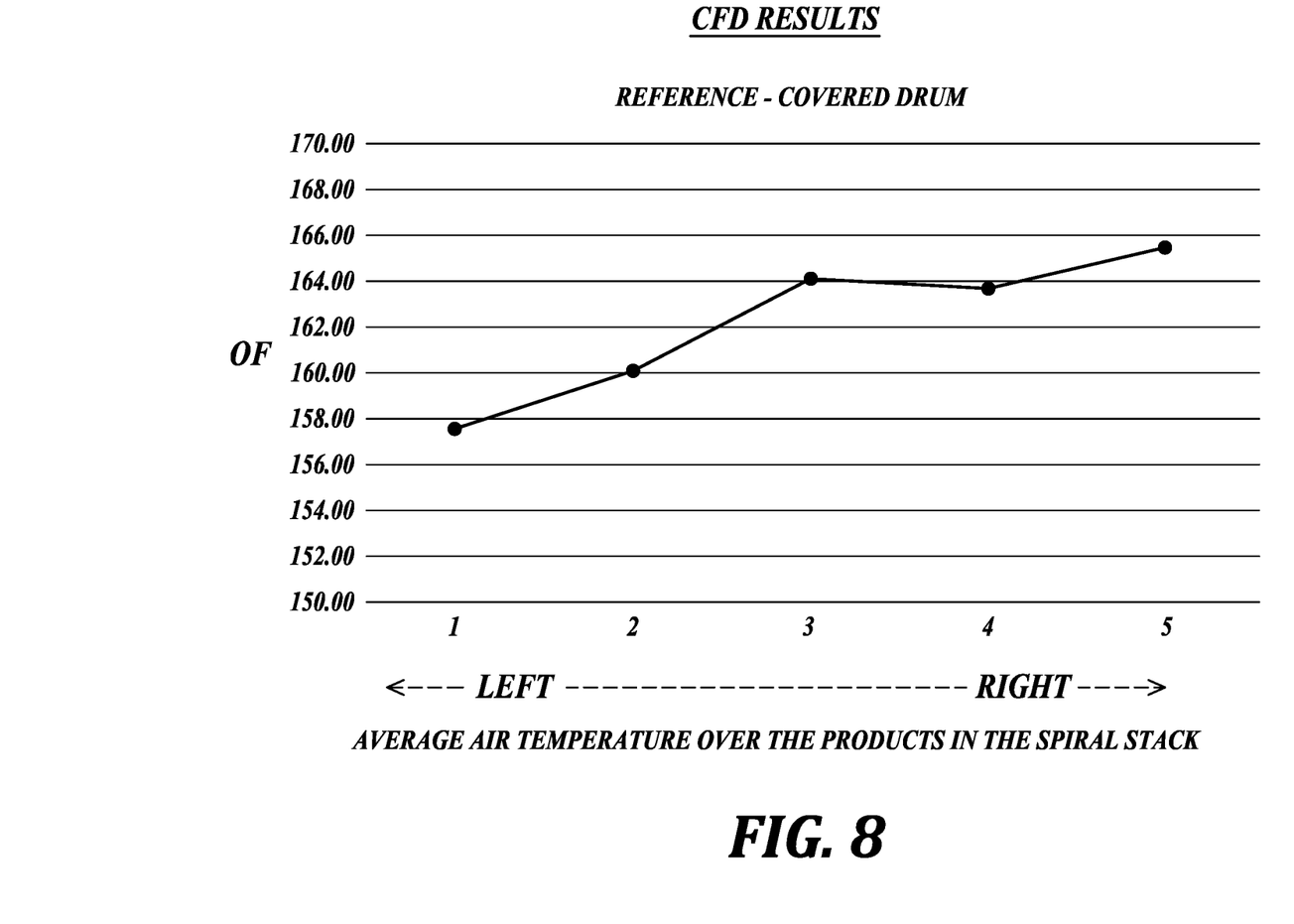
FIG. 8 corresponds to Example 1, and is a graph showing the temperature of food products positioned across a conveyor tier when the exterior of the drive hub is closed, thereby requiring the processing medium to flow around the drive when passing across the conveyor tier.

This is an example of a thermal processing apparatus wherein the drive hub of the spiral stack is of closed construction so that all of the processing medium flows around the drive hub when flowing across the spiral stack from the entrance side of the stack to the exit side of the stack where the circulation fan(s) is located. In this example, as shown in FIG. 8, the temperature of the processing medium over the work product located along the outside of the conveyor belt width (designated by the number 5) is at a temperature of approximately 166° F., whereas the temperature of the processing medium over the work product along the inside of the s conveyor belt width (designated by the number 1) is at a temperature of approximately 157.5° F.

As a result, the temperature difference of the processing medium between the outside and inside of the spiral conveyor belt (across the width of the spiral conveyor belt) is about 8° F.

EXAMPLE 2

Figure 9:
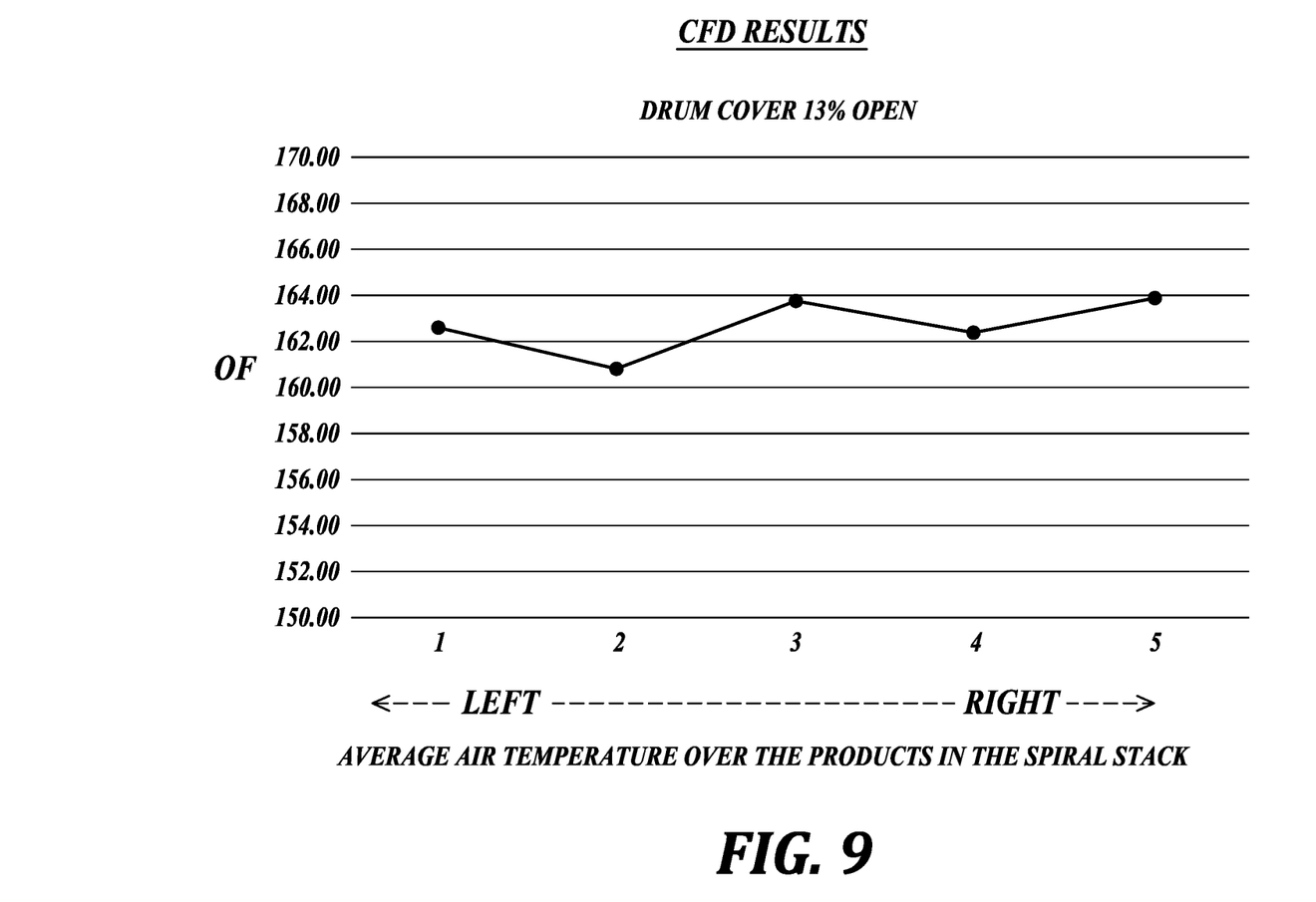
FIG. 9 corresponds to Example 2, and is a graph showing the temperature of food products positioned across the conveyor tier when openings in the form of slots are formed in the exterior of the drive hub so that the heated processing medium within the drive hub can pass outwardly of the drive hub and over the adjacent portion of the conveyor tier.

In this example, the thermal processing apparatus was constructed so that an opening in the top sheet above the spiral stacks resulted in approximately 7% of the processing medium flows into the interior of the drive hub. In addition, the drive hub was constructed with vertical slots constituted approximately 13% of the surface area of the drive drum cover. In this example, as shown in FIG. 9, the temperature of the processing medium over the work product located at the outside of the conveyor belt width (designated by the number 5) is at a temperature of approximately 164° F., whereas the processing medium located over the work product located at the inside of the conveyor belt (designated by the number 1) is heated to a temperature of approximately 163° F. Thus, the temperature difference of the processing medium between the outside and inside of the conveyor belt (across the width of the spiral conveyor belt) is only about 1° F.

While illustrative embodiments have been illustrated and described, it will be appreciated that various changes can be made therein without departing from the spirit and scope of the invention.

The embodiments of the invention in which an exclusive property or privilege is claimed are defined as follows:

1. A thermal processing apparatus comprising:
   (a) a powered drive drum tower having a height and a covered exterior with openings formed in the covered exterior that constitute from about 5% to about 20% of the area of the covered exterior;
   (b) a conveyor having a side edge engaged against the exterior of the drive drum tower in a spiral path around the drive drum tower to form a tiered spiral stack;
   (c) a top sheeting disposed over the spiral stack to cover the spiral stack;
   (d) a circulation system to collect gaseous thermal processing medium from the tiers on the spiral stack and direct processing medium along an upward flow path located outward of the spiral stack to an elevation above the top sheeting, and then across the top sheeting, and then in a downward flow path outward of the exterior of the spiral stack at a location across from the upward flow path of the thermal processing medium, to enter the tiers of the spiral stack,
   (e) the top sheeting defining at least one entrance opening located above the drive drum tower to provide a flow route for a portion of the thermal processing medium flowing across the top sheeting to downwardly enter the drive drum tower and then flow out of the drive drum tower through the openings in the covered exterior of the drive drum tower and across the tiers of the spiral stack.

2. The thermal processing apparatus of claim 1, wherein the openings formed in the covered exterior of the drive drum constitute from about 10% to about 15% of the area of the covered exterior.

3. The thermal processing apparatus of claim 1, wherein openings formed in the covered exterior of the drive drum extend along the height of the drum tower.

4. The thermal processing apparatus of claim 3, wherein openings formed in the covered exterior of the drive drum comprise slots extending along the height of the drum tower.

5. A thermal processing apparatus comprising:
   (a) powered drive drum tower having a height and a covered exterior with openings formed in the covered exterior that constitute from about 5% to about 20% of the area of the covered exterior;
   (b) a conveyor having a side edge engaged against the exterior of the drive drum tower in a spiral path around the drive drum tower to form a tiered spiral stack;
   (c) a top sheeting disposed over the spiral stack;
   (d) a circulation system to collect gaseous thermal processing medium from the tiers on the spiral stack and direct processing medium along an upward flow path located outward of the spiral stack to an elevation above the top sheeting, and then across the top sheeting, and then in a downward flow path along the exterior of the spiral stack at a location across from the upward flow path of the thermal processing medium, to enter the tiers of the spiral stack;
   (e) the top sheeting defining at least one entrance opening located above the drive drum tower to provide a flow route for a portion of the thermal processing medium flowing across the top sheeting to downwardly enter the drive drum tower and then flow out of the drive drum tower through the openings in the covered exterior of the drive drum tower and across the tiers of the spiral stack; and
   wherein the percentage of thermal processing medium flowing through the at least one entrance opening in the top sheeting is in the range of 2% to 12% of the total flow of the gaseous thermal processing fluid.

6. The thermal processing apparatus of claim 5, wherein the percentage of thermal processing medium flowing through the at least one entrance opening in the top sheeting is in the range of 5% to 10% of the total flow of the gaseous thermal processing fluid.

7. The thermal processing apparatus of claim 1, further comprising one or more diverter structures extending upwardly from the top sheeting to divert thermal processing medium into the entrance opening.

8. A thermal processing apparatus comprising:
   (a) a powered drive drum tower having a height and a covered exterior with openings formed in the covered exterior that constitute from about 5% to about 20% of the area of the covered exterior;
   (b) a conveyor having a side edge engaged against the exterior of the drive drum tower in a spiral path around the drive drum tower to form a tiered spiral stack;
   (c) a top sheeting disposed over the spiral stack;
   (d) a circulation system to collect gaseous thermal processing medium from the tiers on the spiral stack and direct processing medium along an upward flow path located outward of the spiral stack to an elevation above the top sheeting, and then across the top sheeting, and then in a downward flow path along the exterior of the spiral stack at a location across from the upward flow path of the thermal processing medium, to enter the tiers of the spiral stack,
   (e) the top sheeting defining at least one entrance opening located above the drive drum tower to provide a flow route for a portion of the thermal processing medium flowing across the top sheeting to downwardly enter the drive drum tower and then flow out of the drive drum tower through the openings in the covered exterior of the drive drum tower and across the tiers of the spiral stack, (f) one or more diverter structures extending upwardly from the top sheeting to divert thermal processing medium into the entrance opening; and (g) wherein the diverter structures comprising a hood structure extending upwardly from the top sheeting to divert thermal processing medium into the entrance opening.

9. The thermal processing apparatus of claim 1, further comprising a heat exchanger for transferring thermal energy from or to the thermal processing medium.

10. The thermal processing apparatus of claim 9, wherein the heat exchanger is positioned above the top sheeting within the flow path of the thermal processing medium.

11. The thermal processing apparatus of claim 10, wherein the entrance opening is formed in the top sheeting downstream the location of the heat exchanger.

12. A thermal processing apparatus, comprising:

(a) a housing;

(b) a conveyor belt arranged into two spiral interconnected stacks positioned side-by-side to each other within the housing, the conveyor belt of each stack having an inside edge engaged against the exterior of an upright drum tower for driving the conveyor belt in tiered angular travel paths for supporting work products during thermal processing;

(c) the drum towers having a covered exterior with openings formed in the covered exterior that constitute from about 5% to about 20% of the area of the covered exterior;

(d) an upright partition wall positioned between the two spiral stacks of the conveyor belt;

(e) a top sheeting disposed over the two spiral stacks of the conveyor belt to cover the spiral stacks;

(f) a circulation system positioned in the housing with respect to each spiral conveyor stack at locations spaced away from the partition wall to draw spent gaseous thermal processing medium from the tiers of the spiral stacks and direct the thermal processing medium along upward flow paths located outward of the spiral stacks to an elevation above the top sheeting, and then across the top sheeting toward the center partition wall, and then downwardly along a flow path exterior of the spiral stacks and adjacent the partition wall to laterally enter the tiers of the conveyor belt stacks;

(g) the top sheeting for each of the conveyor belt stacks defining at least one entrance opening disposed above a corresponding drive drum tower to provide an alternative flow route for a portion of the thermal processing medium downwardly into the drive drum towers and then flow out of the drive drum towers through the openings in the covered exterior of the drive drum towers and across the tiers of the conveyor belt stacks.

13. The thermal processing apparatus of claim 12, wherein openings formed in the covered exterior of the drive drums constitute from about 10% to about 15% of the area of the covered exterior.

14. The thermal processing apparatus of claim 12, wherein openings formed in the covered exterior of the drive drums extend along the height of the drum towers.

15. The thermal processing apparatus of claim 14, wherein openings formed in the covered exterior of the drive drums comprise slots extending along the heights of the drum towers.

16. A thermal processing apparatus, comprising:

(a) a housing;

(b) a conveyor belt arranged into two spiral interconnected stacks positioned side-by-side to each other within the housing, the conveyor belt of each stack having an inside edge engaged against the exterior of an upright drum tower for driving the conveyor belt in tiered angular travel paths for supporting work products during thermal processing;

(c) the drum towers having a covered exterior with openings formed in the covered exterior that constitute from about 5% to about 20% of the area of the covered exterior;

(d) an upright partition wall positioned between the two spiral stacks of the conveyor belt;

(e) a top sheeting disposed over the two spiral stacks of the conveyor belt;

(f) a circulation system positioned in the housing with respect to each spiral conveyor stack at locations spaced away from the partition wall to draw spent gaseous thermal processing medium from the tiers of the spiral stacks and direct the thermal processing medium along upward flow paths located outward of the spiral stacks to an elevation above the top sheeting, and then across the top sheeting toward the center partition wall, and then downwardly along a flow path exterior of the spiral stacks and adjacent the partition wall to laterally enter the tiers of the conveyor belt stacks;

(g) the top sheeting for each of the conveyor belt stacks defining at least one entrance opening disposed above a corresponding drive drum tower to provide an alternative flow route for a portion of the thermal processing medium downwardly into the drive drum towers and then flow out of the drive drum towers through the openings in the covered exterior of the drive drum towers and across the tiers of the conveyor belt stacks; and (h) wherein the percentage of thermal processing medium flowing through the at least one entrance opening in the top sheeting is in the range of 2% to 12% of the total flow of the gaseous thermal processing fluid.

17. The thermal processing apparatus of claim 16, wherein the percentage of thermal processing medium flowing through the at least one entrance opening in the top sheeting is in the range of 5% to 10% of the total flow of the gaseous thermal processing fluid.

18. The thermal processing apparatus of claim 12, further comprising one or more diverter structures extending upwardly from the top sheeting to divert thermal processing medium into the entrance openings.

19. A thermal processing apparatus, comprising:

(a) a housing;

(b) a conveyor belt arranged into two spiral interconnected stacks positioned side-by-side to each other within the housing, the conveyor belt of each stack having an inside edge engaged against the exterior of an upright drum tower for driving the conveyor belt in tiered angular travel paths for supporting work products during thermal processing;

(c) the drum towers having a covered exterior with openings formed in the covered exterior that constitute from about 5% to about 20% of the area of the covered exterior;

(d) an upright partition wall positioned between the two spiral stacks of the conveyor belt;

(e) a top sheeting disposed over the two spiral stacks of the conveyor belt;

(f) a circulation system positioned in the housing with respect to each spiral conveyor stack at locations spaced away from the partition wall to draw spent gaseous thermal processing medium from the tiers of the spiral stacks and direct the thermal processing medium along upward flow paths located outward of the spiral stacks to an elevation above the top sheeting, and then across the top sheeting toward the center partition wall, and then downwardly along a flow path exterior of the spiral stacks and adjacent the partition wall to laterally enter the tiers of the conveyor belt stacks;

(g) the top sheeting for each of the conveyor belt stacks defining at least one entrance opening disposed above a corresponding drive drum tower to provide an alternative flow route for a portion of the thermal processing medium downwardly into the drive drum towers and then flow out of the drive drum towers through the openings in the covered exterior of the drive drum towers and across the tiers of the conveyor belt stacks;

(h) one or more diverter structures extending upwardly from the top sheeting to divert thermal processing medium into the entrance openings; and (i) wherein the diverter structures comprising hood structures extending upwardly from the top sheeting to divert thermal processing medium into the entrance openings.

20. The thermal processing apparatus of claim 12, further comprising heat exchangers for transferring thermal energy from or to the thermal processing medium.

21. The thermal processing apparatus of claim 20, wherein the heat exchangers are positioned above the top sheeting within the flow path of the thermal processing medium.

22. The thermal processing apparatus of claim 21, wherein the entrance openings are formed in the top sheeting downstream the locations of the heat exchangers.

\* \* \* \* \*